3,133,886
SURFACE ACTIVE COMPOSITIONS CONTAINING FLUOROALCOHOLS
William A. Zisman, Silver Spring, Md., and Marianne K. Bernett, Washington, D.C., assignors to the United States of America as represented by the Secretary of the Navy
No Drawing. Filed Mar. 23, 1961, Ser. No. 97,974
17 Claims. (Cl. 252—354)
(Granted under Title 35, U.S. Code (1952), sec. 266)

The invention described herein may be manufactured and used by or for the Government of the United States of America for governmental purposes without the payment of any royalties thereon or therefor.

The invention relates to the wetting of low-energy organic solids in aqueous media, more particularly to new synergistic combinations of wetting agents therefor.

Aqueous dispersions of low-energy organic solids are prepared with the assistance of a wetting agent in solution in the water. Water alone will not spread on such solids due to its high surface tension. The stability of the dispersions will depend on the surface tension of the aqueous solution which is a function of the wetting agent employed. It will be at maximum only when the surface tension of the aqueous solution is the same as or less than the critical surface tension of the solid, resulting in zero contact angle, from which condition the aqueous solution will freely spread over the surface of the solid particles to completely wet the same. To arrive at the favorable condition of zero contact angle requires selection in respect to the wetting agent.

A low-energy organic solid of practical interest is polytetrafluoroethylene which is known in the trade as Teflon. Commercial aqueous dispersions of Teflon are prepared with the use of conventional wetting agents. They have not been satisfactory, however, from the standpoint of stability, being so unstable as to cause serious difficulty in storing and shipping and in their application as coatings.

It has been made known through the work of Fischer and Gans, Ann. N.Y. Acad. Sci. 46, 373 (1946), that no single conventional wetting agent, by which is meant wetting agents in which the hydrophobic group is a hydrocarbon, which may be aliphatic or aromatic, has the capacity to lower the surface tension of water at 25° C. below 26 to 27 dynes/cm. Teflon has a critical surface tension of between 18 and 19 dynes/cm. No aqueous solution containing a single conventional wetting agent will spread on Teflon so as to completely wet the same and yield stable dispersions.

An investigation heretofore undertaken in the field of surface-active agents has indicated the fluoroalcohols which are omega-hydroperfluoroalkylcarbinols,

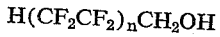

and perfluoroalkylcarbinols, $F(CF_2)_nCH_2OH$ to be sources of wetting agents capable of decreasing the surface tension of water below the capacity of a single conventional wetting agent so to do. However, they are either too insoluble in water to obtain effective concentrations or where sufficiently water-soluble (the lower members of the series) require such high concentrations to be effective as to be uneconomical in view of their high cost.

It is an object of the present invention to promote the use of fluoroalcohols of the kind defined above as wetting agents in aqueous media and in an economical manner. It is also an object to provide new synergistic combinations of wetting agents including a fluoroalcohol of the kind defined above for use in aqueous media.

We have found that the above and other objects of the invention can be accomplished by the use of a fluoroalcohol of the kind defined above which is practically insoluble in water with an amount of a conventional wetting agent which is sufficient to materially increase the solubility of the fluoroalcohol in water. The conventional wetting agent is employed in amounts above the critical micelle concentration therefor in water and the fluoroalcohol in amounts below the critical micelle concentration for the same in water in forming the new synergistic wetting agent compositions of the invention.

Conventional wetting agents which may be used in conjunction with the fluoroalcohol wetting agents as defined above for the preparation of the new synergistic wetting agent compositions of the invention are from the sodium di-alkylsulfosuccinates of which preferred members are those in which the alkyl group contains from 4 to 8 carbon atoms and from the sodium alkylsulfates of which preferred members are those containing from 12 to 18 carbon atoms. Among the sodium sulfosuccinate wetting agents which may be used are, for example, sodium di-n-butyl-, sodium di-n-amyl-, sodium di-n-hexyl-, sodium di-n-octyl- and sodium di(ethylhexyl) sulfosuccinate, and among the sodium alkylsulfate wetting agents are, for example, sodium lauryl-, sodium myristyl-, sodium cetyl- and sodium octadecylsulfates and mixtures of sodium alkylsulfates derived from the mixed coconut fatty alcohols which contain the alcohols in a range from $C_8$ to $C_{18}$ and predominate in the $C_{12}$ and $C_{14}$ members of the series.

Fluroalcohols useful in the preparation of synergistic wetting agent compositions of the invention are the nearly water-insoluble alcohols of the series

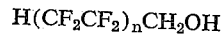

wherein $n$ is an integer from 3 to 6, for example, omega-hydroperfluorohexyl-, omega-hydroperfluorooctyl-, omega-hydroperfluorodecyl- and omega-hydroperfluorododecylcarbinols, and of the series $F(CF_2)_nCH_2OH$ wherein $n$ is an integer from 5 to 17, for example, perfluoropentyl-, perfluoroheptyl-, perfluorononyl-, perfluoroundecyl- and perfluoroheptadecylcarbinols.

The function of the conventional wetting agent in the preparation of the new wetting composition is as a solubilizing agent for the nearly water-insoluble fluoroalcohols whereby the latter become dissolved in sufficient concentrations in the aqueous solution as to cause them to become effective wetting agents, particularly for the preparation of aqueous dispersions of low-energy solids such as Teflon. The new synergistic wetting agent compositions will function in aqueous solution to completely or almost completely wet the surface of Teflon.

Solutions of wetting agents in water form a colloidal system above a certain minimum concentration through spontaneous formation of colloidal aggregates called micelles. This minimum concentration of the wetting agent in solution is called the critical micelle concentration. It can be determined in known way for individual wetting agents. It is a value of small order, for example, that of sodium di(ethylhexyl) sulfosuccinate is 1.2 g./liter, or sodium di-n-octyl sulfosuccinate 4.8 g./liter, and of sodium laurylsulfate 2.3 g./liter.

The amount of conventional wetting agent to be used in solubilizing the fluoroalcohol for preparation of the aqueous compositions of the invention may be varied considerably provided that it is always above the critical micelle concentration therefor. In general only that amount should be used which will be effective to promote solubility of the fluoroalcohol in the solution. The ratio of the conventional wetting agent to the fluoroalcohol generally may be of the order of from about 4 to 9:1 parts by weight.

The solubility of the fluoroalcohols and by consequence their concentration in the aqueous solution is promoted through being taken up into the micelles of the conventional wetting agent. It is essential therefore that the conventional wetting agent have sufficient solubility in water that micelles of the same may be formed in the solution. Where it does not possess the necessary solubility, the same may be gained by the use of a mutual solvent which is a water-miscible alcohol such as methanol, ethanol, isopropanol and the fluoroalcohol $CF_3CH_2OH$. The mutual solvent will increase the solubility in water of the conventional wetting agent, and is especially useful where such are of limited solubility, e.g., those with long chains. For this purpose, a volume of the water-miscible alcohol may be used which ranges, for example, from one to five percent on the water present up to about an equal volume therewith in the new compositions. In this way useful concentrations of the fluoroalcohol can be attained in the solutions.

The preparation of the new synergistic wetting agent compositions of the invention is illustrated by the following specific examples:

Example 1

To 100 ml. of water was added 0.90 gram of sodium laurylsulfate and 0.10 gram of omega-hydroperfluorooctylcarbinol, $H(CF_2CF_2)_4CH_2OH$, for a total of 1% by weight solutes. The mixture was warmed slightly with shaking to dissolve the solutes in the water. The resulting solution was cooled to 25° C. and its wetting activity determined by measuring its surface tension by the known ring method, using the Harkins and Jordon correction tables, and by the maximum bubble pressure method using the Cassel tensiometer with glass tips. The surface tension for the solution was 20.3 dynes/cm. as against 36.4 dynes/cm. for the comparative 1% solution of sodium lauryl sulfate alone.

For the like solution in which the total solutes was 0.5% and 0.25% and the percent concentration of the fluoroalcohol on the total solutes was the same, the surface tension at 25° C. was 21.6 and 24.5 dynes/cm., respectively. The surface tension of the comparative sodium lauryl sulfate solutions at 25° C. was 36.4 and 37.0 dynes/cm., respectively.

Example 2

Solutions in water were prepared as in the preceding example with the fluoroalcohol $H(CF_2CF_2)_5CH_2OH$ and sodium laurylsulfate. The total solutes in the solutions was 0.5%, 0.5% and 0.25% by weight, respectively. The concentration of the fluoroalcohol therein was 10.7%, 5.9% and 11.1% of the total solutes weight, respectively. Surface tension values of the synergistic solutions at 25° C. was 27.0, 27.2 and 32.7 dynes/cm., respectively, as against 36.4, 36.4 and 37 dynes/cm. for the comparative solutions of sodium laurylsulfate alone.

Example 3

Solutions in water were prepared as in Example 1 with the perfluorinated alcohol $F(CF_2)_5CH_2OH$ and sodium laurylsulfate. The total solutes in the solutions was 1.0% and 0.5% by weight, respectively. The concentration of the fluoroalcohol was 10.3% and 10.3% of the total solute weight, respectively. The surface tension of the solutions at 25° C. was 26.3 and 30.7 dynes/cm., respectively, as against 36.4 and 36.4 dynes/cm. for the comparative solutions of sodium laurylsulfate alone.

Example 4

Solutions in water were prepared as in Example 1 with the perfluorinated alcohol $F(CF_2)_7CH_2OH$ and sodium laurylsulfate. The total solutes in the solutions was 1.0% and 1.0% and 0.5% by weight, respectively. The concentration of the fluoroalcohol therein was 7.0%, 5.0% and 5.0% of the total solute weight, respectively. The surface tension of the solutions at 25° C. was 21.8, 23.1 and 26.2 dynes/cm., respectively, as against 36.4 dynes/cm. for the comparative solutions of sodium laurylsulfate alone.

Example 5

A solution in water of the perfluorinated alcohol $F(CF_2)_9CH_2OH$ and sodium laurylsulfate was prepared as in Example 1. The total solute content of the solution was 0.5% by weight and the concentration of the fluoroalcohol therein 10.3% of the total solute weight. The surface tension of the solution at 25° C. was 30.2 dynes/cm. as against 36.4 dynes/cm. for the comparative solution of sodium laurylsulfate alone.

Example 6

A solution in water of the fluoroalcohol

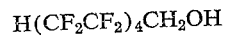

$H(CF_2CF_2)_4CH_2OH$ and sodium myristyl sulfate was prepared as in Example 1. The total solute content of the solution was 0.2% by weight and the concentration of the fluoroalcohol, 20.2% of the total solute weight. The surface tension of the solution at 25° C. was 23.7 dynes/cm. as against 37.3 dynes/cm. for the comparative solution of sodium myristylsulfate alone.

Example 7

Separate solutions in water were prepared as in Example 1 from sodium di-n-octyl sulfosuccinate and the fluoroalcohols, $H(CF_2CF_2)_3CH_2OH$, $H(CF_2CF_2)_4CH_2OH$ and $H(CF_2CF_2)_5CH_2OH$. The total solutes weights of the solution were 0.25%, 0.5% and 0.4%, respectively, and the concentration of the fluoroalcohols therein was 18.2%, 10% and 10.1% of the total solutes weight, respectively. The surface tension at 25° C. for the solution of the $C_7$ fluoroalcohol was 23.2 dynes/cm., for the solution of the $C_9$ fluoroalcohol was 19.9 dynes/cm. and for the solution of the $C_{11}$ fluoroalcohol was 22.2 dynes/cm. The surface tension of comparative solutions of the sodium di-n-octyl sulfosuccinate alone were 25.9, 24.3 and 25 dynes/cm., respectively.

A similar water solution of sodium di-n-octyl sulfosuccinate and the perfluorinated alcohol, $F(CF_2)_7CH_2OH$, in which the total solutes weight was 0.25% and the concentration of the fluoroalcohol was 9.8% of the total solutes weight, had a surface tension at 25° C. of 21.7 dynes/cm. as against 25.9 dynes/cm. for the comparative solution of the sulfosuccinate alone.

Example 8

Following the procedure of Example 1, water solutions of the perfluorinated alcohol $F(CF_2)_7CH_2OH$ were prepared with the following sodium dialkylsulfosuccinates:

(1) Sodium di (ethylhexyl) sulfosuccinate,
(2) Sodium di-n-hexyl sulfosuccinate,
(3) Sodium di-n-amyl sulfosuccinate and
(4) Sodium di-n-butyl sulfosuccinate. The total solutes weight of the respective solutions was (1) 1.0%, (2) 1.0%, (3) 4.0% and (4) 8.0%. The concentration of the fluoroalcohol in the respective solutions was (1) 22.9%, (2) 24.3%, (3) 19.5% and (4) 17.8% of the total solutes weight. The surface tension values of the solutions at 25° C. was (1) 17.6 dynes/cm., (2) 16.7 dynes/cm., (3) 15.4 dynes/cm. and (4) 15.2 dynes/cm., as against (1) 26.3 dynes/cm., (2) 28.8 dynes/cm., (3) 29.8 dynes/cm. and (4) 33.2 dynes/cm. for the comparative solutions of the respective sulfosuccinates alone.

The effect of the presence of a water-miscible alcohol to promote the concentration of the fluoroalcohols in aqueous solution containing a conventional wetting agent is demonstrated by the following results.

Example 9

Following the procedure of Example 1, sodium laurylsulfate and the fluoroalcohol $F(CF_2)_7CH_2OH$ were dissolved in a water-methanol solution containing a small percent of methanol (about 2 to 5% by volume) to give a solution having 0.5% by weight of total solutes and a concentration of the fluoroalcohol of 21.6% of the total solute weight. The surface tension of the solution at 25° C. was 19.1 dynes/cm. In contrast, the surface tension of the like solution not containing a mutual solvent has a lower concentration of the fluoroalcohol in solution and a surface tension which is higher by as much as about 4 dynes/cm.

*Example 10*

Solutions of the fluoroalcohol $F(CF_2)_9CH_2OH$ and the conventional wetting agent were prepared as described in Example 9 using as the solvent a solution of equal volumes of water and methanol. In addition to the fluoroalcohol, the respective solutions contained (1) sodium cetylsulfate for a total solutes weight of 0.1% and a fluoroalcohol concentration of 25.3% of the total solutes weight, (2) sodium myristylsulfate for a total solutes weight of 0.2% and a fluoroalcohol concentration of 24.7% of the total solutes weight, (3) sodium laurylsulfate for a total solutes weight of 0.5 and a fluoroalcohol concentration of 22.2% of the total solutes weight and (4) sodium di-n-amylsulfosuccinate for a total solutes weight of 6% and a fluoroalcohol concentration of 3.6% of the total solutes weight. The surface tensions of the respective solutions at 25° C. were (1) 20.3 dynes/cm., (2) 17.1 dynes/cm., (3) 19.5 dynes/cm. and (4) 16.8 dynes/cm. The comparative solutions of the conventional wetting agents alone had surface tensions of (1) 34.2 dynes/cm., (2) 34.2 dynes/cm., (3) 33.5 dynes/cm. and (4) 28.8 dynes/cm. The surface tension of the solvent—$H_2O:CH_3OH$—in 1:1 volume ratio is 34.2 dynes/cm.

While the invention has been described above with reference to certain specific embodiments thereof, these are intended primarily by way of illustration and not in limitation except as may be defined in the appended claims.

What is claimed is:

1. A surface active composition having wetting power in aqueous media consisting essentially of in aqueous solution a first wetting agent selected from the group consisting of sodium dialkyl sulfosuccinates and sodium alkylsulfates in a concentration above the critical micelle concentration therefor and a second wetting agent which is a nearly water-insoluble fluoroalcohol of from 6 to 18 carbon atoms selected from the group consisting of omega-hydroperfluoroalkylcarbinols and perfluoroalkylcarbinols, said first wetting agent and said fluoroalcohol being present in the solution in the ratio of from about 4 to 9:1 parts by weight in a concentration below the critical micelle concentration therefor.

2. A composition as defined in claim 1, wherein the first wetting agent is a sodium di-alkyl sulfosuccinate in which the alkyl group has from 4 to 8 carbon atoms.

3. A composition as defined in claim 2, wherein the fluoroalcohol is an omega-hydroperfluoroalkylcarbinol having from 9 to 11 carbon atoms.

4. A composition as defined in claim 2, wherein the fluoroalcohol is omega-hydroperfluorooctylcarbinol.

5. A composition as defined in claim 2, wherein the fluoroalcohol is a perfluoroalkylcarbinol having from 8 to 12 carbon atoms.

6. A composition as defined in claim 2, wherein the fluoroalcohol is perfluoroheptylcarbinol.

7. A composition as defined in claim 1, wherein the first-mentioned wetting agent is a sodium alkylsulfate having from 12 to 18 carbon atoms.

8. A composition as defined in claim 7, wherein the fluoroalcohol is an omega-hydroperfluoroalkylcarbinol having from 9 to 11 carbon atoms.

9. A composition as defined in claim 7, wherein the fluoroalcohol is a perfluoroalkylcarbinol having from 8 to 12 carbon atoms.

10. A composition as defined in claim 8, wherein the sodium alkylsulfate is sodium lauryl sulfate and the fluoroalcohol is omega-hydroperfluorooctylcarbinol.

11. A composition as defined in claim 9, wherein the sodium alkylsulfate is sodium laurylsulfate and the fluoroalcohol is omega-hydroperfluoroheptylcarbinol.

12. A surface active composition having wetting power in aqueous media consisting essentially of in aqueous solution a water-miscible alcohol in amount from about 1% by volume up to about an equal volume on the water present, a first wetting agent selected from the group consisting of sodium di-alkyl sulfosuccinates and sodium alkylsulfates in a concentration above the critical micelle concentration and a second wetting agent which is a nearly water-insoluble fluoroalcohol of from 6 to 18 carbon atoms selected from the group consisting of omega-hydroperfluoroalkylcarbinols and perfluoroalkylcarbinols, said first wetting agent and said fluoroalcohol being present in the solution in the ratio of from about 4 to 9:1 parts by weight in a concentration below the critical micelle concentration therefor.

13. A composition as defined in claim 12, wherein the water miscible alcohol is methanol.

14. A composition as defined in claim 12, wherein the first wetting agent is a sodium di-alkyl sulfosuccinate in which the alkyl group contains from 8 to 12 carbon atoms.

15. A composition as defined in claim 12, wherein the first wetting agent is a sodium alkyl sulfate having from 12 to 18 carbon atoms.

16. A composition as defined in claim 14, wherein the water-miscible alcohol is methanol and the volume ratio of methanol to water is about 1:1.

17. A composition as defined in claim 14, wherein the water-miscible alcohol is methanol and the volume ratio of methanol to water is about 1:1.

References Cited in the file of this patent

UNITED STATES PATENTS 2,512,435    Mitchell et al. _____ June 20, 1950

OTHER REFERENCES

Schwartz et al.: Surface Active Agents and Detergents, vol. II (1958), page 150, Interscience Publishers, N.Y.

Chemical and Eng. News, vol. 31, No. 6 (1953), article by Brice et al., pp. 510–513.

UNITED STATES PATENT OFFICE
CERTIFICATE OF CORRECTION

Patent No. 3,133,886                                              May 19, 1964

William A. Zisman et al.

It is hereby certified that error appears in the above numbered patent requiring correction and that the said Letters Patent should read as corrected below.

Column 5, lines 49 to 52 and column 6, lines 30 to 34, for ", said first wetting agent and said fluoroalcohol being present in the solution in the ratio of from about 4 to 9:1 parts by weight in a concentration below the critical micelle concentration therefor", each occurrence, read -- in a concentration below the critical micelle concentration therefor, said first wetting agent and said fluoroalcohol being present in the solution in the ratio of from about 4 to 9:1 parts by weight --.

Signed and sealed this 3rd day of November 1964.

(SEAL)
Attest:

ERNEST W. SWIDER                                      EDWARD J. BRENNER
Attesting Officer                                          Commissioner of Patents